Patented Dec. 2, 1952

2,620,354

UNITED STATES PATENT OFFICE 2,620,354

PRODUCTION OF GUANIDINO FATTY ACIDS

Bruno Vassel and Walter D. Janssens, Toledo, Ohio, assignors to International Minerals & Chemical Corporation, a corporation of New York No Drawing. Application January 12, 1951, Serial No. 205,828

11 Claims. (Cl. 260—534)

This invention relates to the preparation of guanidino type compounds. More particularly, it relates to a method for the manufacture of guanidino substituted fatty acids such as glycocyamine.

A number of processes are known whereby alpha-guanidino substituted fatty acids may be prepared. For example, glycocyamine has been prepared by heating guanidine carbonate with glycine at temperatures which will drive off water and carbon dioxide. Glycocyamine has also been prepared by the reaction of glycine with pure cyanamide in the presence of ammonia. The commercial acceptance of either of these processes is somewhat limited in that the amino fatty acid reactant, such as glycine, is a relatively expensive and unavailable chemical. It would be advantageous if guanidino substituted fatty acids could be prepared from relatively low-priced chemicals which are commercially available.

It is an object of this invention to provide a process for the manufacture of guanidino type compounds in which the use of one of the reactants, of the relatively unavailable and expensive amino fatty acids, is eliminated.

It is another object of the invention to provide a process wherein alpha-guanidino substituted fatty acids are produced from crude cyanamides and from alpha-halo fatty acids.

It is a further object to provide a commercially feasible process whereby commercially acceptable yields of pure glycocyamine are obtained and in which crude cyanamide and chloroacetic acid are the primary raw materials.

These and other objects of the invention will become more apparent upon a fuller understanding of the invention as hereinafter described.

It has been found that guanidino substituted fatty acids are prepared by the reaction of a cyanamide compound in a liquid medium with a heated mixture containing halo fatty acid and in which ammonia and carbon dioxide or their chemical equivalents are present, said reaction being carried out in the presence of hydroxyl ions.

More specifically, an alpha-guanidino substituted fatty acid is prepared by reacting cyanamide in liquid medium with a mixture resulting from heating an alpha-halo fatty acid in the presence of controlled quantities of ammonium ions and carbonate ions, said reaction being carried out at an elevated temperature and in the presence of controlled quantities of hydroxyl ions, and recovering alpha-guanidino substituted fatty acid from the reaction products.

In one specific embodiment of the instant invention, the process comprises adding a cyanamide in solution to a mixture resulting from heating in a closed system a solution containing an alpha-halo fatty acid, such as chloroacetic acid, carbon dioxide, and ammonia, at a temperature of between about 40° C. and about 190° C. for between about 4 and about 24 hours, adjusting the pH of the resulting mixture with a base to between about 8.0 and about 10.0, heating the adjusted mixture at an elevated temperature until the reaction has proceeded to substantial completion, for example, at between about 50° C. and about 95° C. for between about ¾ and about 6 hours, cooling and storing the resulting mixture for at least about 8 hours, and recovering guanidino substituted fatty acid therefrom.

The process is carried out by preparing a solution of a cyanamide in which the cyanamide is present in amount sufficient to obtain between about a 3 and about an 8 molar solution. Preferably, a cyanamide solution is prepared having a concentration of cyanamide of between about 4.5 and about 7 moles per liter of solution.

By the term "a cyanamide in solution" is meant a solution in which this reactant is present uncombined with any metallic ions, such as sodium, potassium, calcium, and the like. Cyanamide compounds useful for the purposes of the instant invention are cyanamide itself, phenyl cyanamide, and the like when an aqueous medium is used. The reaction may also be carried out in organic solvents in which cyanamide compounds, such as cyanamide, phenyl cyanamide, benzyl cyanamide, diethyl cyanamide, ethylbutyl cyanamide, and similar cyanamides are soluble, that is, in liquid mediums, such as alcohols; for example, methyl alcohol, ethyl alcohol; or ketones, such as acetone or methylethyl ketone, and the like. Such cyanamide compounds as are employed in solvents other than water may be reacted with the heated mixture containing the halo fatty acid and in which carbon dioxide and ammonia, or their chemical equivalents, are present, provided the second reactant is at least partially soluble in the liquid medium.

The cyanamide may be prepared by extraction from crude calcium cyanamide with an aqueous acid solution, such as aqueous sulfuric acid, as described and claimed in copending application, Serial No. 202,574, filed December 23, 1950.

The pH of the cyanamide in solution is adjusted prior to reaction with the above-described heated mixture by the use of a base, such as sodium hydroxide, potassium hydroxide, calcium hydroxide, ammonium hydroxide, triethylamine, tributylamine, and the like. By the addition of the base, the pH of the solution of the resulting reaction mixture is adjusted to between about 8.0 and about 10.0, preferably between about 9.3 and about 9.4.

In practicing one embodiment of the instant invention, the mixture containing the alpha-halo fatty acid, carbon dioxide, and ammonia is prepared by dissolving about 1 mole of chloroacetic acid in between about 300 cc. and about 400 cc. of water which is added to about 750 cc. of water containing 11 moles of gaseous ammonia or ammonium hydroxide and about 3 moles of gaseous carbon dioxide. The resulting mixture is heated at a temperature of about 60° C. in a closed system for at least about 6 hours. The resulting mixture is then concentrated until the internal temperature of the reaction mixture reaches between about 105° C. and about 116° C., preferably between about 112° C. and about 116° C. under atmospheric pressure. The cyanamide solution containing between about 0.8 and about 2.0 moles of cyanamide is added to the concentrated mixture, and the pH of the mixture is adjusted to between about 8.0 and about 10.0 with a base, such as sodium hydroxide. The adjusted mixture is then heated at a temperature of between about 50° C. and about 95° C. for between about ¾ and about 6 hours, and glycocyamine crystals are recovered from the resulting reaction products.

In practicing the instant invention, ammonia and carbon dioxide, or substances which are chemical equivalents of ammonia and carbon dioxide, are present in the halo fatty acid mixture. Carbon dioxide and ammonia, their chemical equivalents, their chemical progenitors, or compounds acting as a mixture of the two, may be employed. For example, gaseous ammonia may be replaced by ammonium hydroxide. Ammonium carbonate may also be employed, in that it acts chemically as a mixture of carbon dioxide and ammonia. If the mole ratio of chloroacetic acid to ammonia to carbon dioxide in the mixture is about 1:11:3, this same ratio is obtained by substituting 3 moles of ammonium carbonate for 6 moles of the ammonia. The preferred mole ratio in practicing the instant invention is about 1:11:3. When lower ratios than this are employed, such as 1:8:3, yields are somewhat less than are obtained with the preferred mole ratio. The fatty acid-containing mixture is heated for between about 4 and about 24 hours at a temperature of between about 40° C. and about 190° C. At the higher temperatures, shorter periods of heating are required. The fatty acid-containing mixture is preferably heated for at least about 6 hours at about 60° C. This temperature is about maximum unless pressure equipment is employed. If pressure equipment is used, the higher temperatures may be utilized, and at higher temperatures, the period of heating required is shorter than 6 hours. Also, if the reaction temperature and pressure are raised, lower ratios of the reactants, for example, a ratio of about 1:3:1, may be employed.

All of the halo fatty acids are useful for purposes of the instant invention. For example, chloroacetic acid, alpha-chloropropionic acid, alpha-bromoacetic acid, gamma-chlorobutyric acid, and the like may be employed.

The mixture resulting from the heating of the alpha-halo fatty acid-ammonia-carbon dioxide mixture is mixed with a cyanamide in liquid medium and heated at an elevated temperature until the reaction yielding the guanidino substituted fatty acid is substantially complete. The cyanamide is preferably added stepwise to the heated fatty acid mixture obtained from about 1 mole of fatty acid, about 11 moles of ammonia, and about 3 moles of carbon dioxide. For example, in a preferred embodiment, about 0.75 mole of a cyanamide solution is added to the above fatty acid reaction mixture, and the pH is adjusted to between about 9.3 and about 9.4. The resulting mixture is heated for between about ¾ and about 6 hours at a temperature of between about 50° C. and about 95° C. In a preferred practice, the mixture is heated for at least about ¾ hour at between about 90° C. and about 95° C. Then an additional 0.75 mole of cyanamide in solution, adjusted to a pH of between about 9.3 and about 9.4, is mixed with the partially reacted mixture, and the resulting mixture heated at least about ¾ hour additional at between about 90° C. and about 95° C. If desired, the reaction may be carried out at lower temperatures. However, if this is done, the period of heating must be extended in order to obtain comparable yields of the product. For example, if the reaction is carried out at 60° C., the mixture is heated for at least about 5 hours between each addition of cyanamide. If the reaction is carried out at 25° C., a period of at least about 3 days is required for the reaction to proceed to substantial completion.

In one embodiment of the instant invention, glycocyamine is recovered from the products obtained by the reaction of chloroacetic acid and cyanamide as above-described by separating solids from the reaction products, such as by filtration. The filter cake is then treated with a solvent, such as methanol, ethyl alcohol, isopropyl alcohol, or butanol, which will dissolve impurities, such as dicyandiamide. For example, butanol saturated with respect to glycocyamine and dicyandiamide at 25° C. is added to the filter cake in sufficient amount to dissolve substantially all of the dicyandiamide at a temperature of between about 90° C. and about 95° C., and the resulting mixture is heated at a temperature of between about 90° C. and about 95° C. for between about 10 and about 15 minutes. The resulting mixture is filtered while hot, and the filtrate is cooled. Dicyandiamide crystallizes from the filtrate. The liquid medium can be decanted and reused for a new batch. Pure glycocyamine is recovered in about 65% yield by adding water to the filter cake, heating the resulting mixture, and crystallizing glycocyamine therefrom.

By this method, glycocyamine, alpha-guanidinopropionic acid, alpha-guanidino-n-butyric acid, and the like may be prepared. Such compounds have utility as pharmaceuticals, alone or in combination with other compounds.

The invention will be further understood from a study of the following example illustrating one embodiment of the practices of the present invention, but it is understood that the following example is illustrative only and that there is no intent to limit the invention thereto.

*Example*

About 1 mole of chloroacetic acid is dissolved in about 300 cc. of water. The chloroacetic acid solution is added slowly to about 11 moles of gaseous ammonia and about 3 moles of gaseous carbon dioxide in about 750 cc. of water. The resulting mixture is heated at a temperature of about 60° C. in a closed system for about 6 hours and is then concentrated until the internal temperature of the reaction mixture reaches about 112° C. under atmospheric pressure. The evolved ammonia and carbon dioxide gases are recycled to the next batch. To the resulting mixture is added about a 4.5 molar solution of cyanamide containing about 0.75 mole of cyanamide, and the pH of the resulting mixture is adjusted with 50% sodium hydroxide to about 9.4. The resulting mixture is heated for about 1 hour at a temperature of about 90° C. to 95° C. Additional cyanamide solution, adjusted to a pH of about 9.4 and containing about 0.75 mole of the cyanamide, is added to the partially reacted mixture, and heating is continued at a temperature of between about 90° C. and about 95° C. for about 1 hour. The resulting mixture is cooled to about room temperature and allowed to stand for about 8 hours. The resulting mixture is filtered, and the filter cake is treated with about 100 cc. of butanol, saturated with respect to glycocyamine and dicyandiamide, for every 2.6 grams of filter cake. The resulting mixture is heated to between about 90° C. and about 95° C. for about 10 minutes, and the resulting mixture filtered while hot. The filtrate is cooled, and dicyandiamide crystallizes therefrom. The filter cake is boiled with twice its weight in water, cooled to room temperature, and allowed to stand for about 8 hours. The resulting crystals are filtered from the mixture, washed with cold water, and dried. Substantially pure glycocyamine is recovered in about 65% yield.

Having thus fully described and illustrated the character of the invention, what is desired to be secured and claimed by Letters Patent is:

1. A process for the preparation of guanidino substituted carboxylic acids which comprises reacting a cyanamide with a mixture prepared by heating a halo fatty acid in a liquid medium in which ammonia and carbon dioxide are present, said reaction being carried out in the presence of hydroxyl ions, and recovering guanidino substituted carboxylic acid from the reaction products.

2. A process for the preparation of guanidino substituted carboxylic acids which comprises reacting a cyanamide with a mixture prepared by heating an alpha-halo fatty acid in a liquid medium and in which ammonia and carbon dioxide are present, said reaction being carried out in the presence of hydroxyl ions, and recovering alpha-guanidino substituted fatty acid from the reaction products.

3. A process for the preparation of guanidino substituted carboxylic acids which comprises heating a mixture containing an alpha-halo fatty acid in a liquid medium in which ammonia and carbon dioxide are present, mixing a cyanamide in liquid medium with the resulting mixture, adjusting the pH of the resulting reaction mixture to between about 8 and about 10, heating the resulting mixture at an elevated temperature, and recovering guanidino substituted fatty acid from the resulting mixture upon substantial completion of the reaction.

4. A process for the preparation of guanidino substituted carboxylic acids which comprises heating for between about 4 and about 24 hours at a temperature of between about 40° C. and about 190° C. an alpha-halo fatty acid in solution and in the presence of ammonium ions and carbonate ions, adding a cyanamide in solution to the heated mixture, adjusting the pH of the resulting reaction mixture to between about 8 and about 10, and heating the resulting mixture at an elevated temperature, and recovering guanidino substituted fatty acid from the resulting mixture upon substantial completion of the reaction.

5. A process for the preparation of glycocyamine which comprises heating for between about 4 and about 24 hours at a temperature of between about 40° C. and about 190° C. a solution of chloroacetic acid in the presence of ammonium ions and carbonate ions, concentrating the resulting mixture, adding cyanamide in solution to the concentrated mixture, adjusting the pH of the resulting reaction mixture to between about 8 and about 10, heating the resulting mixture at an elevated temperature, and recovering glycocyamine from the resulting mixture upon substantial completion of the reaction.

6. A process for the preparation of glycocyamine which comprises heating in a closed system for at least about 6 hours at a temperature of about 60° C. a solution of chloroacetic acid in the presence of ammonium ions and carbonate ions, adding cyanamide in solution to the resulting mixture, adjusting the pH of the resulting reaction mixture to between about 8 and about 10, heating the resulting mixture at a temperature of between about 50° C. and about 95° C. for between about ¾ and about 6 hours, and recovering glycocyamine from the reaction products.

7. A process for the preparation of guanidino substituted fatty acids which comprises heating a mixture containing about 1 mole of an alpha-halo fatty acid, about 8 moles of ammonium ions and about 3 moles of carbonate ions in a liquid medium, at a temperature of between about 60° C. and about 95° C. for at least about 6 hours, heating and concentrating the resulting mixture to an internal temperature of between about 105° C. and about 116° C., adding to the concentrated mixture a cyanamide in solution containing between about 0.8 and about 2.0 moles of the cyanamide, adjusting the pH to between about 8 and about 10, heating the resulting mixture at a temperature of between about 50° C. and about 95° C. for between about ¾ and about 6 hours, and recovering guanidino substituted fatty acid from the reaction products.

8. A process for the preparation of guanidino substituted fatty acids which comprises heating in a closed system a mixture containing about 1 mole of an alpha-halo fatty acid, about 8 moles of ammonium ions and about 3 moles of carbonate ions in a liquid medium for at least about 6 hours at a temperature of at least about 60° C., adding a cyanamide in solution to the mixture, adjusting the pH of the resulting mixture to between about 8.0 and about 10.0, heating the mixture at a temperature of between about 50° C. and about 95° C., and recovering guanidino substituted fatty acid from the resulting mixture upon substantial completion of the reaction.

9. A process for the preparation of glycocyamine which comprises heating in a closed system a mixture containing about 1 mole of chloroacetic acid, about 8 moles of ammonium ions, and about 3 moles of carbonate ions in a liquid medium, at a temperature of at least about 60° C. for at least about 6 hours, concentrating the resulting mixture by heating to an internal temperature of between about 105° C. and about 116° C., adding a solution containing at least about 1.5 moles of cyanamide, adjusting the pH of the heated mixture to between about 9.0 and about 9.5, heating the resulting mixture at a temperature of between about 50° C. and about 95° C. for at least about ¾ hour, and recovering glycocyamine from the reaction products.

10. A process for the preparation of guanidino substituted fatty acids which comprises heating in a closed system a mixture containing about 1 mole of an alpha-halo fatty acid, about 11 moles of ammonia, and about 3 moles of carbon dioxide in a liquid medium, at a temperature of about 60° C. for about 6 hours, heating and concentrating the resulting mixture to an internal temperature of between about 112° C. and about 116° C., adding to the concentrated mixture a solution containing about 1.5 moles of cyanamide, adjusting the pH of the heated mixture to between about 9.3 and about 9.5, heating the resulting mixture at a temperature of between about 90° C. and about 95° C. for at least about ¾ hour, and recovering the guanidino substituted fatty acid from the reaction products.

11. A process for the preparation of glycocyamine which comprises heating a mixture containing about 1 mole of chloroacetic acid, about 11 moles of ammonia, and about 3 moles of carbon dioxide in a liquid medium for at least about 6 hours at a temperature of about 60° C., heating and concentrating the resulting mixture to an internal temperature of between about 112° C. and 116° C., adding to the concentrated mixture a solution containing about 1.5 moles of cyanamide, adjusting the pH of the heated mixture to between about 9.3 and about 9.5, heating the resulting mixture at a temperature of between about 90° C. and about 95° C. for at least about ¾ hour, and recovering glycocyamine from the reaction products.

BRUNO VASSEL.
WALTER D. JANSSENS.

REFERENCES CITED

The following references are of record in the file of this patent:

UNITED STATES PATENTS

| Number | Name | Date |
|---|---|---|
| 1,967,400 | Fischl | July 24, 1934 |
| 2,225,155 | Cheronis | Dec. 17, 1940 |
| 2,425,341 | Paden et al. | Aug. 12, 1947 |

FOREIGN PATENTS

| Number | Country | Date |
|---|---|---|
| 285,873 | Great Britain | Feb. 24, 1927 |

OTHER REFERENCES

Strecker, Compt. rend. (Fr. Acad. Sci.), vol. 52, p. 1212 (1861).